US011023532B2

(12) United States Patent
Avazpour et al.

(10) Patent No.: US 11,023,532 B2
(45) Date of Patent: Jun. 1, 2021

(54) GENERATION OF DATA MODEL MAPPING A DATA CENTER (71) Applicant: CERNER INNOVATION, INC., Kansas City, KS (US)

(72) Inventors: Jim S. Avazpour, Overland Park, KS (US); Timothy C. Fite, Lee's Summit, MO (US); Douglas Saus, Platte City, MO (US); Volodymyr Polishchuk, Kansas City, MO (US)

(73) Assignee: CERNER INNOVATION, INC., Kansas City, KS (US)

( * ) Notice: Subject to any disclaimer, the term of this patent is extended or adjusted under 35 U.S.C. 154(b) by 781 days.

(21) Appl. No.: 15/240,293

(22) Filed: Aug. 18, 2016

(65) Prior Publication Data
US 2018/0052945 A1  Feb. 22, 2018

(51) Int. Cl.
G06F 16/00 (2019.01)
G06F 16/9038 (2019.01)
H04L 29/12 (2006.01)
G06F 16/901 (2019.01)
G06F 16/903 (2019.01)

(52) U.S. Cl.
CPC ........ G06F 16/9038 (2019.01); G06F 16/901 (2019.01); G06F 16/90335 (2019.01); H04L 61/103 (2013.01); H04L 61/1511 (2013.01); H04L 61/6022 (2013.01); Y02D 30/00 (2018.01)

(58) Field of Classification Search
None
See application file for complete search history.

(56) References Cited

U.S. PATENT DOCUMENTS

| 8,462,794 B2* | 6/2013 | Dobbins | H04L 45/34 370/395.53 |
| 2015/0200910 A1* | 7/2015 | Yamada | H04L 61/103 370/254 |

OTHER PUBLICATIONS

Kari Seppanen. Oct. 30, 2006. Dependability of All IP Networks: Resiliency in Ethernet Based Transport Networks. 2006.*

* cited by examiner

Primary Examiner — Tuankhanh D Phan
(74) Attorney, Agent, or Firm — Shook, Hardy & Bacon LLP (57) ABSTRACT Systems and methods provide for automatically generating a data model of a data center. Inventory data identifying devices in the data center is obtained by querying the devices and/or extracting the data from existing data sources. In addition, switch-to-switch data regarding the linking relationships among switches is obtained by querying the switches in the data center using a discovery protocol. Further, switch-to-server relationship data regarding the linking relationships between switches and servers is obtained at least in part by querying switches in the data center for MAC table data to identify the MAC addresses of servers connected to the switches. The inventory data, switch-to-switch relationship data, and switch-to-server relationship data is persisted to the data model of the data center, thereby providing information identifying devices within the data center and the dependencies and relationships among the devices.

20 Claims, 7 Drawing Sheets

| 100 PER PAGE ⌄ | FORMAT ⌄ 304 | PREVIEW ⌄ 306 | | | | | <PREV [1] 2 3 4 5 6 7 8 9 ... NEXT> | | |
|---|---|---|---|---|---|---|---|---|---|
| 302 | | | | 308 | 310 | 312 | 314 | 316 | 318 |
| CORE_DEVICE | AGG_DEVICE | BORDER_SERV_DEVICE | SPINE_DEVICE | LEAF_DEVICE | ENC_DEVICE | HOSTNAME | IP_ADDRESS | MAC_ADDRESS | INTERFACE_DISPLAY |
| CORE-BLUE | AGG-BLUE | X7-BL-RED | SPINE2 | LD10-BLUE | DD4-22-BLUE2 | TX5VSXC05402 | 5.555.555.253 | 6AB568444A10 | ETH119/1/2 |
| CORE-BLUE | AGG-BLUE | X7-BL-RED | SPINE1 | LD10-BLUE | DD4-22-BLUE2 | 5.555.555.20 | 5.555.555.20 | 006065500536 | ETH115/1/1 |
| CORE-BLUE | AGG-BLUE | X7-BL-RED | SPINE1 | LD10-BLUE | DD4-22-BLUE2 | PHWBABDRETX119 | 555.55.555.199 | 006065A312A4 | ETH115/1/7 |
| CORE-BLUE | AGG-BLUE | X8-BL-BLUE | SPINE2 | LD10-BLUE | DD4-22-BLUE2 | 5.555.555.183 | 5.555.555.183 | 006065571ABC | ETH116/1/4 |
| CORE-BLUE | AGG-BLUE | X8-BL-BLUE | SPINE1 | LD10-BLUE | DD4-22-BLUE2 | 5.555.555.188 | 5.555.555.188 | 0060655AB887 | ETH112/1/5 |
| CORE-BLUE | AGG-BLUE | X7-BL-RED | SPINE1 | LD10-BLUE | DD4-22-BLUE2 | TX5VSXC0231 | 5.555.555.218 | 6AB4567896D7 | ETH116/1/15 |
| CORE-BLUE | AGG-BLUE | X8-BL-BLUE | SPINE2 | LD10-BLUE | DD4-22-BLUE2 | 5.555.555.228 | 5.555.555.228 | 0060655AB714 | ETH102/1/15 |
| CORE-BLUE | AGG-BLUE | X8-BL-BLUE | SPINE2 | LD10-BLUE | DD4-22-BLUE2 | TX5VSXC0220 | 5.555.555.207 | 6AB6543215C7 | ETH113/1/6 |
| CORE-BLUE | AGG-BLUE | X8-BL-BLUE | SPINE1 | LD10-BLUE | DD4-22-BLUE2 | BLCCTNTAX08 | 555.55.555.39 | 006065487111 | ETH116/1/7 |
| CORE-BLUE | AGG-BLUE | X7-BL-RED | SPINE1 | LD10-BLUE | DD4-22-BLUE2 | CHCWSPVS02 | 555.55.555.15 | 006065B3378F8 | ETH119/1/7 |
| CORE-BLUE | AGG-BLUE | X8-BL-BLUE | SPINE2 | LD10-BLUE | DD4-22-BLUE2 | 5.555.555.34 | 5.555.555.34 | 006065321A6 | ETH118/1/16 |
| CORE-BLUE | AGG-BLUE | X7-BL-RED | SPINE2 | LD10-BLUE | DD4-22-BLUE2 | 5.555.555.198 | 5.555.555.198 | 006065517A79 | ETH115/1/5 |
| CORE-BLUE | AGG-BLUE | X8-BL-BLUE | SPINE1 | LD10-BLUE | DD4-22-BLUE2 | TX5VSXC0407 | 5.555.555.2 | 6AB6546540A1 | ETH119/1/11 |
| CORE-BLUE | AGG-BLUE | X8-BL-BLUE | SPINE1 | LD10-BLUE | DD4-22-BLUE2 | TX5VSXC0502 | 5.555.555.28 | A0321C0FC187 | ETH101/1/5 |

GENERATION OF DATA MODEL MAPPING A DATA CENTER

BACKGROUND

Large-scale networked systems are commonplace systems employed in a variety of settings for running service applications and maintaining data for business and operational functions. For instance, a data center within a networked system may support operation of a variety of service applications (e.g., web applications, email services, search engine services, etc.). A data center could include thousands of devices, including a complex hierarchy of switches. Each switch could have hundreds of ports and each port could be connected to a server enclosure with multiple blades (i.e., servers) that could each, in turn, be running numerous virtual machines. In multi-tenant data centers, various tenants (i.e., customers employing the data center to run their applications) are dynamically assigned to devices and/or virtual machines running in the data center.

A configuration management database (CMDB) is typically employed to store information regarding the configuration of devices within a data center, as well as the assignment of devices and/or virtual machines to tenants using the data center. The information facilitates managing the resources within the data center. For instance, the CMDB can be referenced when troubleshooting in response to service issues encountered in order to identify malfunctioning devices. As another example, when implementing updates or other changes to the data center environment, the CMDB can be referenced to try to identify tenants that may be impacted so the tenants can be notified of possible service disruptions. However, the usefulness of a CMDB is only as good as the accuracy of the information included in the CMDB. Given the size and dynamic nature of data centers, the information can easily and quickly become stale. Keeping the information up to date can be a very time-consuming task. Additionally, CMDB's often don't provide detailed information regarding dependencies and relationships of devices in the data center. As such, the usefulness of most CMDBs in managing data centers is typically limited.

SUMMARY

Embodiments of the present invention relate to, among other things, automatically generating a data model of a data center to facilitate management of the data center. In accordance with the technology described herein, inventory data that identifies devices within the data center is collected by querying the devices and/or extracting the inventory data from existing data sources. Additionally, switches in the data center are queried using a discovery protocol to obtain switch-to-switch relationship data that provides information regarding the linking relationships among the switches. Further, switches in the data center are interrogated to obtain switch-to-server relationship data to identify the linking relationships between switches and servers. This includes querying switches to extract MAC table data that provides information mapping the MAC addresses of servers to ports on the switches. Additionally, ARP data is obtained to provide information mapping MAC addresses to IP addresses. The MAC data is matched to the ARP data in order to also identify the IP addresses of servers connected to the switches. The inventory data, switch-to-switch relationship data, and the switch-to-server relationship data is persisted in a data model.

Accordingly, in one aspect, an embodiment of the present invention is directed to one or more computer storage media storing computer-useable instructions that, when executed by a computing device, cause the computing device to perform operations. The operations include obtaining inventory data for a data center, the inventory data comprising information identifying switches and servers within the data center. The operations also include querying each switch in the data center using a discovery protocol to obtain switch-to-switch relationship data, the switch-to-switch relationship data from a given switch providing information identifying one or more other switches connected to the given switch. The operations further include generating a switching hierarchy based on the switch-to-switch relationship data, the switching hierarchy identifying connections among the switches in the data center. The operations also include interrogating each of at least a portion of the switches for MAC table data to identify a MAC address for each server connected to each switch from at least the portion of the switches. The operations further include accessing ARP data mapping IP addresses to MAC addresses for servers in the data center, accessing DNS data mapping hostnames to IP addresses for servers in the data center, and obtaining switch-to-server relationship data by matching the MAC table data to the ARP data and the DNS data to identify an IP address and hostname for each server connected to each switch from at least the portion of the switches. The operations still further include generating the data model of the data center based on the inventory data, switching hierarchy, and switch-to-server relationship data.

In another embodiment, an aspect is directed to a computer-implemented method for generating a data model mapping a data center. The method includes obtaining inventory data for a data center, the inventory data comprising information identifying switches and servers within the data center. The method also includes querying each switch in the data center using a discovery protocol to obtain switch-to-switch relationship data, the switch-to-switch relationship data from a given switch providing information identifying one or more other switches connected to the given switch. The method further includes obtaining switch-to-server relationship data for at least a portion of the switches in the data center, the switch-to-server relationship data for a given switch providing information identifying one or more servers connected to the given switch based on MAC table data on the given switch. The method still further includes persisting the inventory data, the switch-to-switch relationship data, and the switch-to-server relationship data in the data model.

A further embodiment is directed to a computer system comprising one or more processors; and one or more computer storage media storing computer-useable instructions that, when used by the one or more processors, cause the one or more processors to: obtain inventory data for a data center, the inventory data comprising information identifying switches and servers within the data center; query each switch in the data center using a discovery protocol to obtain switch-to-switch relationship data, the switch-to-switch relationship data from a given switch providing information identifying one or more other switches connected to the given switch; interrogate each of at least a portion of the switches for MAC table data to identify a MAC address for each server connected to each switch from at least the portion of the switches; access ARP data mapping IP addresses to MAC addresses for servers in the data center; access DNS data mapping hostnames to IP addresses for servers in the data center; obtain switch-to-server relationship data by matching the MAC table data to the ARP data and the DNS data to identify an IP address and hostname for each server connected to each switch from at least the portion of the switches; and generate the data model of the data center based on the inventory data, switch-to-switch relationship data, and switch-to-server relationship data.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is an exemplary user interface providing a denormalized view of a data model mapping devices and connections among device within a data center;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention address the technical challenge of maintaining up to date configuration information regarding a data center by automatically generating a data model of the data center. The data model includes not only information identifying devices within the data center but also the dependencies and relationships among the devices. In accordance with the technology described herein, inventory data is collected regarding devices in the data center. The inventory data includes information identifying the existence of devices within the data center and information describing the devices, such as identifying the type of each device (e.g., switch, server, storage, etc.). The inventory data can be obtained by querying devices, for instance, using the Internet Control Message Protocol (ICMP) and/or the Simple Network Management Protocol (SNMP), and/or by extracting the information from existing data sources used to manage the data center.

In addition to the inventory data, information regarding the dependencies and relationships of devices is collected. This includes switch-to-switch relationship data that provides information regarding the switching hierarchy within the data center. More particularly, switches in the data center are queried using a discovery protocol, such as the Cisco Discovery Protocol (CDP) or the Link Layer Discovery Protocol (LLDP), to obtain information identifying switches connected to ports on each switch. This provides information regarding the dependencies and relationships of switches within the data center. However, information regarding the dependencies and relationships of servers connected to switches is still needed. This can be considered the "last mile" of the data center. Accordingly, configurations described herein also obtain switch-to-server relationship data that identifies the linking relationship between switches and servers. More particularly, switches are interrogated to obtain MAC table data on the switches. The MAC table data on a switch is used to identify the MAC address of servers connected to the switch. Additionally, ARP data is obtained that provides information mapping IP addresses of servers to MAC addresses of the servers. Further, information mapping server hostnames to IP addresses is obtained, for instance, from DNS data or from the inventory data. As such, the IP address and hostnames of the servers connected to each switch is determined by matching the MAC table data from each switch to the ARP data and the information mapping hostnames to IP addresses. The inventory data, switch-to-switch relationship data, and switch-to-server relationship data is persisted to a data model.

As such, the data model provides a complete representation of the data center, including devices and their dependencies. The data collection process can be run automatically and on a regular basis to keep the data model updated as changes to devices and tenant assignments are made to the data center. Accordingly, the data model can be used for a variety of different data center management purposes by querying the data and/or generating views of the data in order to facilitate data center management activities. For instance, the data model can be used when troubleshooting to traverse paths within the data center to pinpoint malfunctioning devices. Additionally, the data model can be used to identify tenants affected by maintenance or update tasks within the data center.

Figure 1:
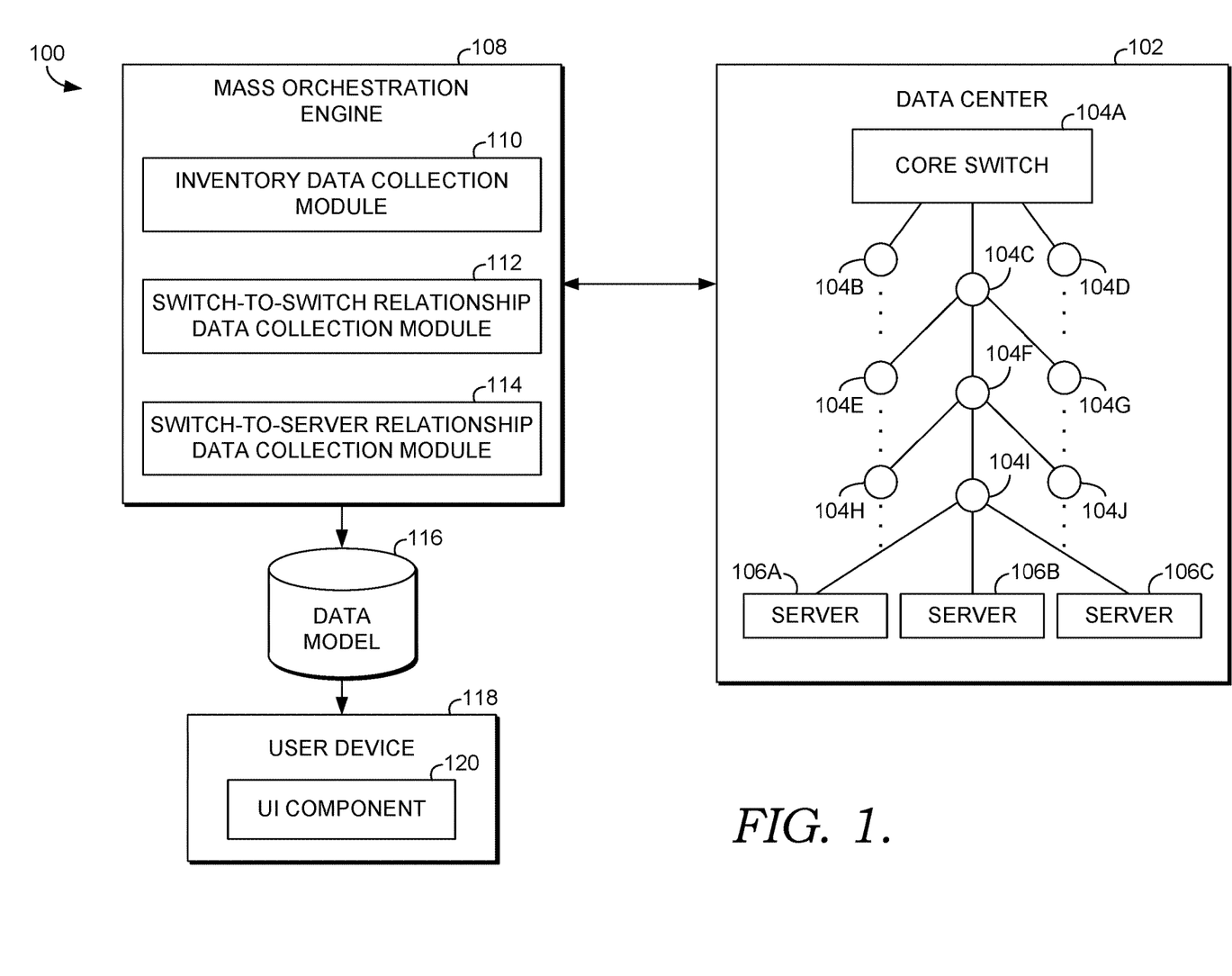
FIG. 1 is a block diagram illustrating an exemplary system in accordance with some implementations of the present disclosure.

With reference now to the drawings, FIG. 1 is a block diagram illustrating an exemplary system 100 for generating a data model mapping a data center in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a data center 102 and a mass orchestration engine 108. The data center 102 generally includes a number of devices for providing computing services. Among the devices is a network of switches, such as the switches 104A-J, that provide for routing of data through the data center 102. The switches comprise a hierarchy that includes one or more core switches, such as the core switch 104A, that provide a first switching layer for communications with outside computing devices employing the data center 102 for computing services. Below the core switch(es) are layers of switches. Although FIG. 1 illustrates a data center 102 having only three layers of switches, it should be understood that any number of layers may be employed. Additionally, the linking among switches and the number of switches has been simplified in FIG. 1. Any number of switches may be included at each layer, and more complex linking relationships than those shown in FIG. 1 may be employed.

Data may be communicated through the switches of the data center 102, for instance, using the IP protocol suite. The switching hierarchy terminates at servers, such as servers 106A-C, which are specifically responsible for hosting and running service applications and maintaining data for the service applications. While only three servers are shown in FIG. 1 for simplification purposes, it should be understood that any number of servers may be included in a data center.

The mass orchestration engine 108 is generally configured to collect information regarding the data center 108 and to persist the information in a data model 116 that provides a map of the data center 102, including information describing the devices in the data center and linking relationships among the devices. As shown in FIG. 1, the mass orchestration engine 108 includes an inventory data collection module 110, a switch-to-switch relationship data collection module 112, and a switch-to-server relationship data collection module 114. The mass orchestration engine 108 may reside on one or more computing devices and may communicate with devices within the data center 102 over a network, for instance, using the IP protocol suite and/or other protocols. While the mass orchestration engine 108 is shown separate from the data center 102 in FIG. 1, it should understood that the mass orchestration engine 108 could reside within the confines of the data center 102.

The inventory data collection module 110 operates to collect inventory data for the data center. The inventory data generally includes information identifying devices within the data center, including information regarding switches, such as the switches 104A-J and server devices, such as the server devices 106A-6. The inventory data may not only identify the existence of devices within the data center but also provide information describing the devices, such as the type of each device and configuration information for each device. For instance, the inventory data can identify each device as a switch, a server, a storage device, or other type of device. Additionally, the inventory data can include network address information, such as IP addresses and MAC address of devices. The inventory data can further include information regarding tenants assigned to server devices. The inventory data can still further include information regarding vlans and virtual machines within the data center.

In some instances, inventory data can be obtained from devices by querying the devices using known protocols, such as ICMP and/or the SNMP. Additionally or alternatively, inventory data can be obtained by extracting the inventory data from various sources. For instance, inventory data can be extracted from an existing CMDB, PROTEUS IP address management platform, ALTIRIS endpoint management platform, HPNA, NETSCOUT data sources, VCENTER solutions, PRIMENETWORK management solution, ONCOMMAND INSIGHT management software, APIC controllers, and OPENSTACK controllers.

The switch-to-switch relationship data collection module 112 operates to collect switch-to-switch relationship data, which provides information regarding linking relationships among switches in the data center (i.e., which switches are directly connected to one another). For instance, the switch-to-switch relationship data for the core switch 104A would indicate that the switches 104B-D are connected to the core switch 104A. The switch-to-switch data is obtained by querying each switch to identify connected switches. The switches are queried using a known discovery protocol, such as CDP or LLDP. The data collected for a given switch can identify which switch is connected to which port on the given switch. Based on data collected from the switches in the data center 102, a switching hierarchy may be generated to represent the switch-to-switch relationship data. The switch-to-switch relationship data is persisted to the data model 116 in conjunction with the inventory data.

The switch-to-server relationship data collection module 114 operates to collect switch-to-server relationship data identifying which servers are connected to which switches in the data center 102. For example, the switch-to-server relationship data for the switch 104I would indicate that servers 106A-C are connected to the switch 104I. The switch-to-server relationship data is persisted to the data model 116 in conjunction with the inventory data and the switch-to-switch relationship data.

To identify servers connected to a given switch, the switch is interrogated to access the MAC table on the switch. For instance, the switch-to-server relationship data collection module 114 may log into the switch using Secure Shell (SSH) to access the MAC table on the switch. The MAC table identifies the MAC addresses of devices connected to the switch. Since the devices included in the MAC table may include switches in addition to servers, the switch-to-server relationship data collection 114 module can identify MAC addresses of switches based on information already collected about switches in the data center 102. Accordingly, those identified MAC addresses are ignored and the remaining MAC addresses are identified as servers connected to the switch.

The switch-to-server relationship data collection module 114 may collect additional information regarding the identification of servers connected to switches. In some embodiments, the switch-to-server relationship data collection module 114 also queries ARP data on switches. The ARP data maps MAC addresses to IP addresses. As such, the ARP data allows for the identification of IP addresses of servers connected to a switch by matching the ARP data to the MAC table data. Additionally, in some configurations, information mapping server hostnames to IP addresses is obtained. The data may be obtained from DNS data and/or from inventory data, if available. This allows for the identification of server hostnames connected to each switch by matching the data to the ARP data and MAC table data. Further, data from the CMDB may map tenants to server hostnames to identify tenants assigned to the servers. As such, the tenants served by servers connected to a switch can be identified based on the CMDB data.

Figure 2:
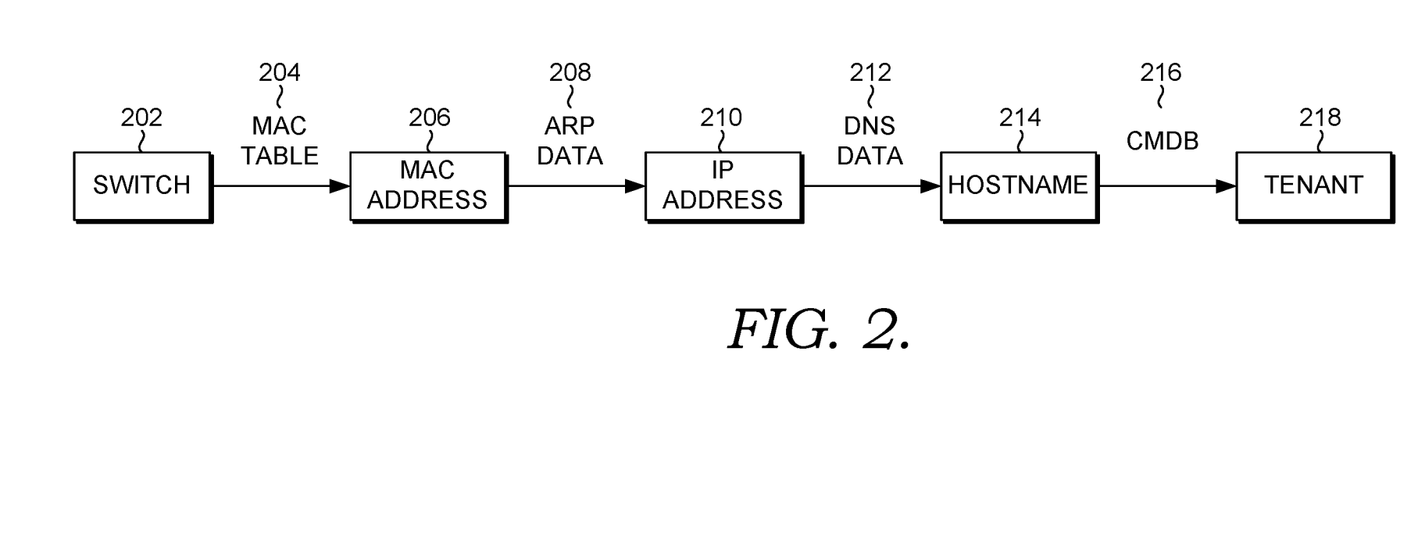
FIG. 2 is a diagram illustrating connecting MAC table data with ARP data, information mapping server hostnames to IP addresses, and information mapping tenants to server hostnames in order to identify information regarding servers connected to switches in a data center.

FIG. 2 provides a diagram illustrating the connection of information to generate switch-to-server relationship data for a given switch 202. As such, in FIG. 2, a MAC table 204 from the switch 202 is used to identify the MAC address 206 of a server connected to the switch 202. ARP data 208 is used to determine the IP address 210 for the server based on the MAC address 206 for the server. DNS data 210 is used to determine the hostname 214 of the server based on the IP address 210. While FIG. 2 illustrates the use of DNS data, as noted above, information mapping hostnames to IP addresses can be available from other sources, such as the inventory data. CMDB data 216 is then used to determine the tenant 218 assigned to the server based on the hostname 214 of the server. While FIG. 2 illustrates generation of switch-to-server relationship data for a single server connected to a switch, the same approach could be performed to generate switch-to-server relationship data for each server connected to the switch. Additionally, while FIG. 2 shows a single tenant associated with the server, it should be understood that a number of tenants may be serviced by the server.

Returning to FIG. 1, based on the data collected and persisted by the mass orchestration engine 108, the data model 116 includes: the inventory data identifying devices in the data center 102; the switch-to-switch relationship data identifying the linking relationships of switches in the switching hierarchy of the data center 102; and the switch-to-server relationship data identifying the linking relationships of servers to switches in the data center 102. This provides a comprehensive mapping of the data center 102 identifying the existence and types of devices in the data center 102, as well as the linking relationships among the devices.

The data model 116 can be used for a variety of different purposes. For instance, one use case is to assess the impact on other devices and/or tenants when a device is down. This could include trouble-shooting situations in which a device is malfunctioning or proactive situations in which a device is planned to be down for maintenance or other purposes. For instance, in the case of a switch or a port of a switch being down, impacted devices downstream from that switch or port can be identified based on the data model 116. Rerouting for the impacted devices could be performed using the data to continue service as needed. Additionally, tenants serviced by impacted devices can be determined, and notifications could be provided to tenants regarding potential impact to servers. The data model 116 can also be used to pinpoint malfunctioning devices in the data center. For instance, if a tenant indicates service issues, the data model 116 can be used to follow the path from bottom to top by starting with server(s) servicing the tenant and working up through the switches in the path leading to the server to identify where a malfunction is occurring. The data model 116 could further be used to help identify devices in the data center 120 that need migration to different devices. The data model 116 could still further be used by feeding the data back into a CMDB to show service models between technical and business services and the impact of the infrastructure.

In some embodiments, such as that shown in FIG. 1, a UI component 120 can be provided on a user device 118 to allow a user to query the data model 116 or otherwise view data from the data model 116 in different views. By way of example only and not limitation, FIG. 3 provides a screenshot of a user interface 300 providing information from a data model generated in accordance with embodiments herein. More particularly, the user interface 300 provides a denormalized view of the data from the data model, in which every path through the network from a core switch to a server is turned into a row in a database. The first column 302 corresponds with a core switch in the data center, while each of columns 304, 306, 308, 310 corresponds with various switches within the switching hierarchy of the data center. The column 312 identifies a server enclosure, while the column 314 identifies the hostname of a server within the server enclosure and the columns 316 and 318 provide the IP address and MAC address of the server, respectively. Generally, the rows are generated based on the switch-to-switch relationship data providing information to identify each possible path through the switching hierarchy and based on the switch-to-server relationship data providing information to identify servers connected to each leaf node switch (i.e., a last switch in the switching hierarchy).

Figure 4:
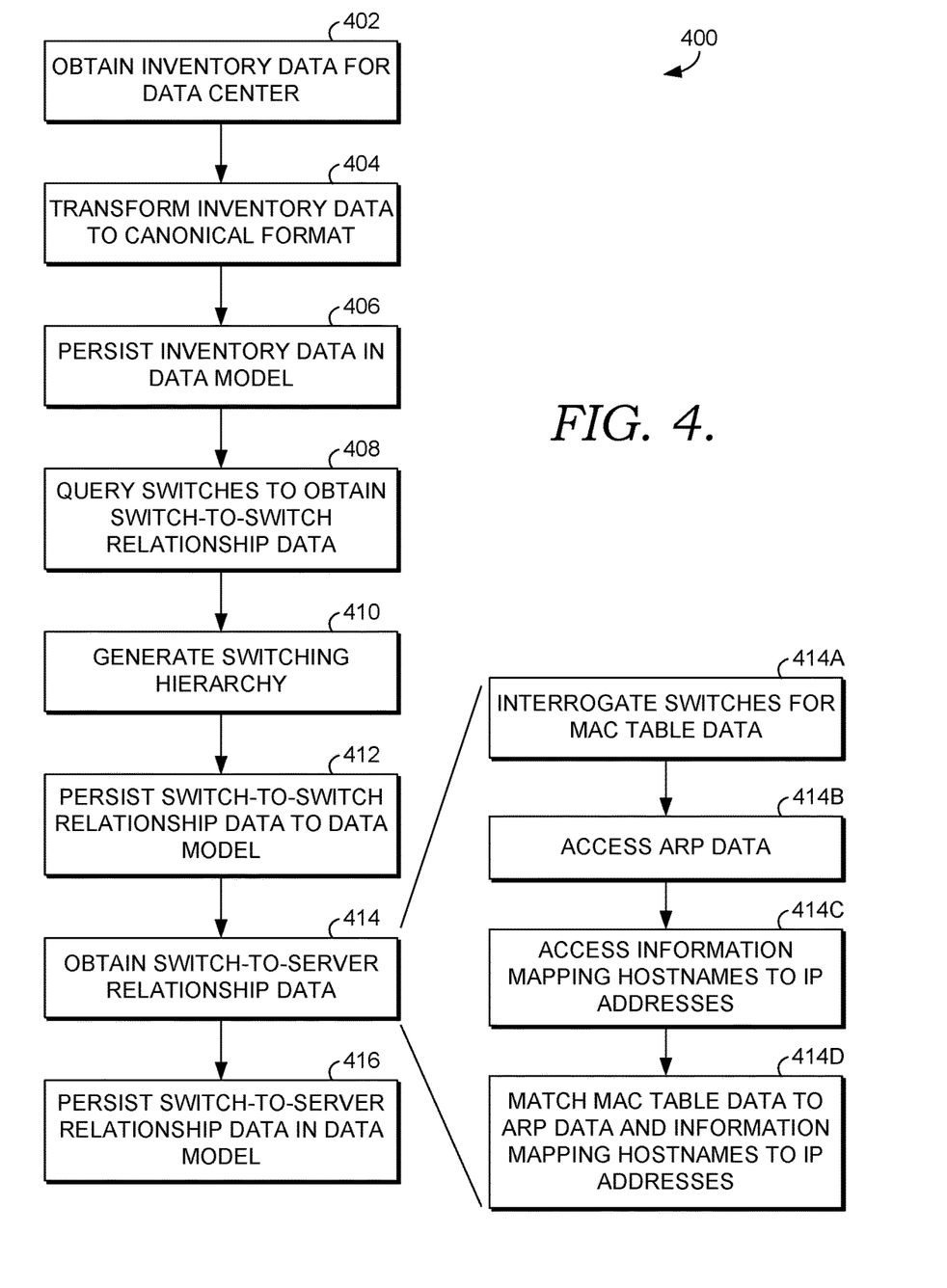
FIG. 4 is a flow diagram showing a method for generating a data model mapping a data center in accordance with some implementations of the present disclosure.

With reference now to FIG. 4, a flow diagram is provided illustrating a method 400 for generating a data model mapping a data center. Each block of the method 400 and any other method described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, inventory data for the data center is obtained. As noted above, the inventory data generally includes information identifying the existence and type of devices within the data center. Additionally, the inventory data can include network address information, such as IP addresses and MAC address of devices. The inventory data can further include information regarding tenants assigned to server devices. The inventory data can still further include information regarding vlans and virtual machines within the data center. The inventory data can be obtained by querying devices using protocols such, such as ICMP and SNMP, and/or the inventory data can be obtained by extracting the inventory data from various sources.

The inventory data is transformed to canonical format, as shown at block 404. Collected data is from a foreign source and each source has its own way of identifying device names, IDs, or other information. Additionally, information for a single device may exist in multiple sources, but each source may identify the device slightly differently (such as by IP address, by fully qualified domain name, or sometimes just a short name). Additionally, relationships among data from the collected sources do not always exist and must be created dynamically based on multiple sources of data. The canonicalization is the blending of all those foreign sources of data and their relationships into a single meaningful data model where unique devices and relationships are only represented once and that can portray the full picture of the data center. The inventory data in canonical format is persisted in the data model, as shown at block 406.

Switches in the data center are queried to obtain switch-to-switch relationship data, as shown at block 408. As noted above, the switch-to-switch relationship data from a given switch provides information identifying one or more other switches connected to that switch. The switches may be queried using a discovery protocol, such as CDP or LLDP. A switching hierarchy is generated based on the data obtained from the switches to identify the hierarchy of connections among the switches in the data center, as shown at block 410. The switch-to-switch relationship data including the switching hierarchy is persisted to the data model, as shown at block 412.

Switch-to-server relationship data is also obtained, as shown at block 414, and the switch-to-server relationship data is persisted to the data model, as shown at block 416. As noted above, the switch-to-server relationship data for a given switch provides information identifying one or more servers connected to the given switch. Obtaining the switch-to-server relationship data includes interrogating switches for MAC table data to identify a MAC address for each server connected to each switch, as shown at block 414A (as described in further detail below with reference to FIG. 5). Additionally, ARP data is accessed, as shown at block 414B (as described in further detail below with reference to FIG. 6). The ARP data provides information mapping IP addresses to MAC addresses for servers in the data center. Information mapping hostnames to IP addresses for servers in the data center is also accessed, as shown at block 414C. This information may be obtained from DNS data and/or from inventory data, if available.

The switch-to-server relationship data that links information regarding servers connected to switches is obtained by matching the MAC table data to the ARP data and the information mapping hostnames to IP addresses, as shown at block 414D. In particular, the MAC table data identifies the MAC addresses of servers connected to each switch. The IP addresses of each of those servers are determined based on the IP addresses mapped to the MAC addresses in the ARP data. Additionally, the hostnames of each of those servers are determined based on the information mapping hostnames to IP addresses (e.g., from DNS or inventory data).

Figure 5:
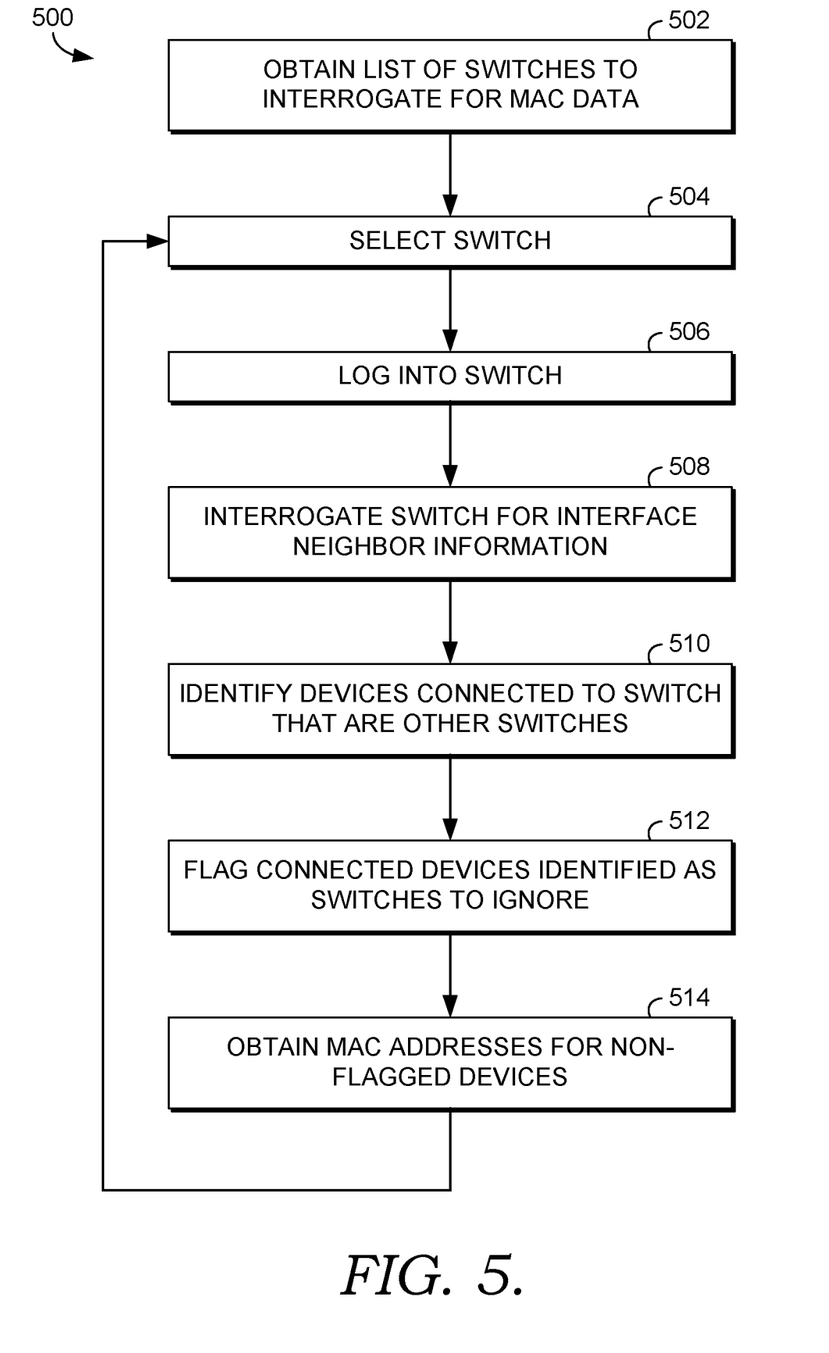
FIG. 5 is a flow diagram showing a method for obtaining MAC data from switches in accordance with some implementations of the present disclosure.

Turning now to FIG. 5, a flow diagram is provided that illustrates a method 500 for obtaining MAC data from switches. As shown at block 502, a list of switches to interrogate for MAC data is obtained. Network devices in the canonical model are assigned a hierarchy level within the switch topology. This hierarchy is mostly based on naming convention combined with the network topology (neighbor) relationships obtained, for instance, by CDP and/or LLDP. The information collected for the data center provides information regarding which hierarchies contain devices that have ARP data (which could be a switch or a firewall) and which ones would have servers tied directly to them where MAC information can be obtained. So the list at block 502 is gathered by querying the canonicalized list of network devices for specific hierarchy levels for each type of data desired (ARP data in this instance).

A switch is selected at block 504, and the switch is logged into at block 506, for instance using Secure Shell (SSH). The switch is interrogated for interface (e.g., CDP or LLDP) neighbor information, as shown at block 508. The interface neighbor information is used to identify devices connected to the switch that are other switches, as shown at block 510. Those connected devices that are identified as switches are flagged to be ignored, as shown at block 512. The MAC addresses for non-flagged devices are obtained from the MAC table on the switch, as shown at block 514. The process of obtaining MAC data is repeated for each switch (sequentially or in parallel), as represented by the return to block 504.

Figure 6:
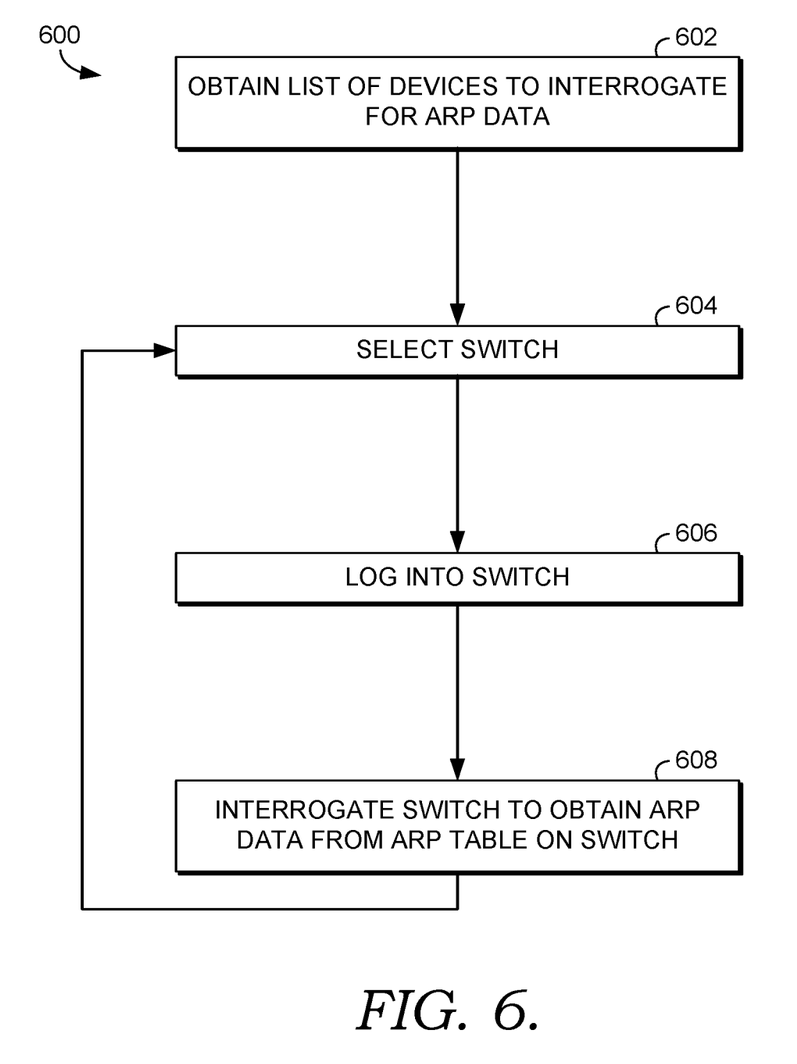
FIG. 6 is a flow diagram showing a method for obtaining ARP data in accordance with some implementations of the present disclosure.

Referring next to FIG. 6, a flow diagram is provided that illustrates a method 600 for obtaining ARP data. As shown at block 602, a list of switches to interrogate for ARP data is obtained. As noted above, network devices in the canonical model are assigned a hierarchy level within the switch topology. This hierarchy is mostly based on naming convention combined with the network topology (neighbor) relationships obtained, for instance, by CDP and/or LLDP. The information collected for the data center provides information regarding which hierarchies contain devices that have ARP data (which could be a switch or a firewall) and which ones would have servers tied directly to them where MAC information can be obtained. So the list at block 602 is gathered by querying the canonicalized list of network devices for specific hierarchy levels for each type of data desired (MAC data in this instance).

A switch is selected at block 604, and the switch is logged into at block 606, for instance using Secure Shell (SSH). The switch is interrogated to obtain ARP data from the ARP table on the switch, as shown at block 608. The process of obtaining ARP data is repeated for each switch (sequentially or in parallel), as represented by the return to block 604.

Figure 7:
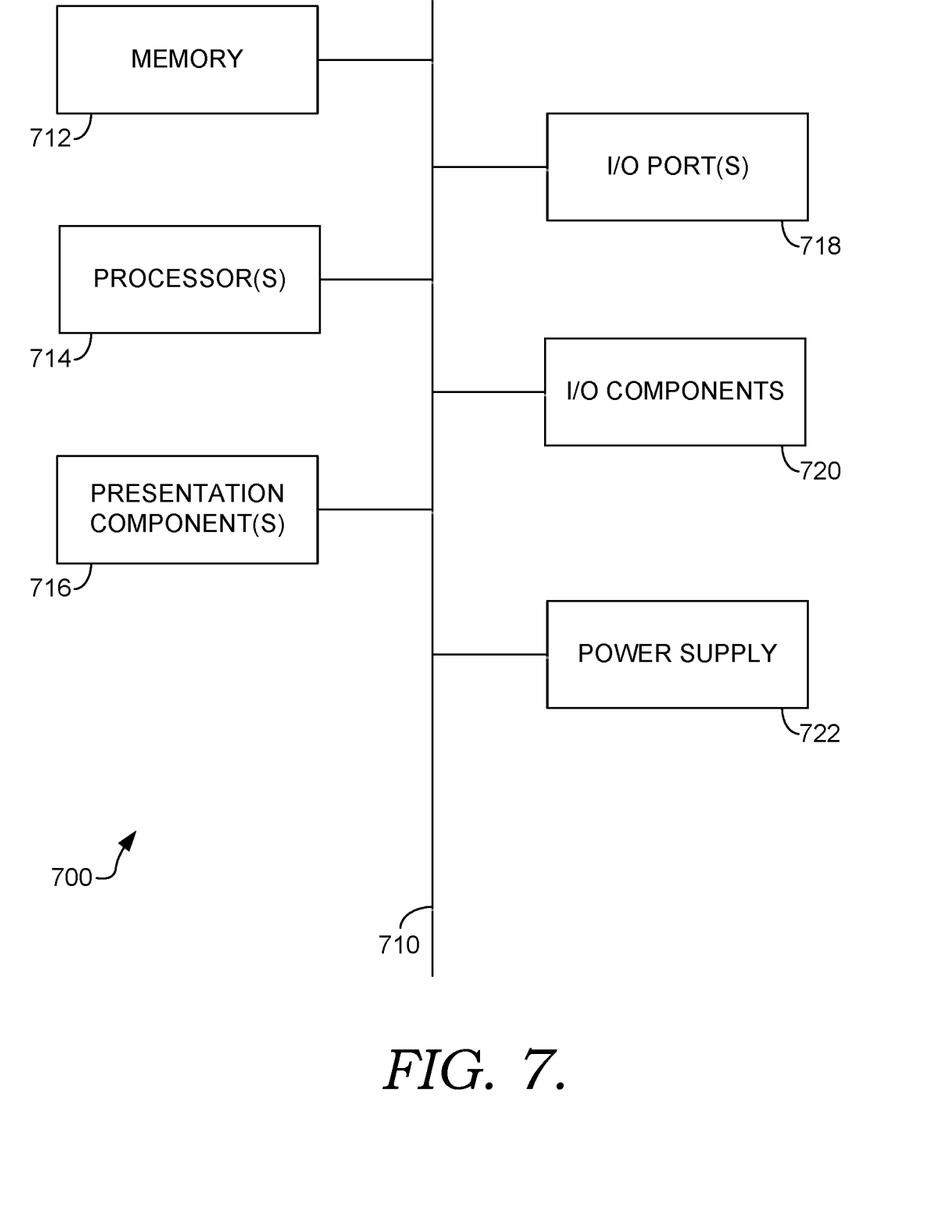
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to automatically generating a data model mapping devices and device connections within a data model. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by a computing device, cause the computing device to perform operations, the operations comprising:
   obtaining inventory data for a data center, the inventory data comprising information identifying switches and servers within the data center;
   querying each switch in the data center using a discovery protocol to obtain switch-to-switch relationship data, the switch-to-switch relationship data from a given switch providing information identifying one or more other switches connected to the given switch;
   generating a switching hierarchy based on the switch-to-switch relationship data, the switching hierarchy identifying connections among the switches in the data center;
   interrogating each of at least a portion of the switches for MAC table data to identify a MAC address for each server connected to each switch from at least the portion of the switches;
   accessing ARP data mapping IP addresses to MAC addresses for servers in the data center;
   accessing DNS data mapping hostnames to IP addresses for servers in the data center;
   obtaining switch-to-server relationship data by matching the MAC table data to the ARP data and the DNS data to identify an IP address and hostname for each server connected to each switch from at least the portion of the switches; and
   generating the data model of the data center based on the inventory data, switching hierarchy, and switch-to-server relationship data.

2. The one or more computer storage media of claim 1, wherein at least a portion of the inventory data is obtained by querying at least a portion of the switches and at least a portion of the server devices using the Internet Control Message Protocol (ICMP) and/or the Simple Network Management Protocol (SNMP).

3. The one or more computer storage media of claim 1, wherein at least a portion of the inventory data is obtained from one or more existing sources of inventory data.

4. The one or more computer storage media of claim 1, wherein the method further comprises transforming the inventory data into a canonical format.

5. The one or more computer storage media of claim 1, wherein the discovery protocol comprises the Cisco Discovery Protocol (CDP) or the Link Layer Discovery Protocol (LLDP).

6. The one or more computer storage media of claim 1, wherein the switch-to-switch relationship data for a first switch identifies other switches connected to the first switch and a port on the first switch to which each of the other switches is connected.

7. The one or more computer storage media of claim 1, wherein interrogating each of at least the portion of the switches for MAC table data comprises interrogating a first switch by:
logging into the first switch;
interrogating the first switch for interface neighbor information to identify devices connected to the first switch that are other switches; and
obtaining from a MAC table on the first switch, MAC addresses for devices connected to the first switch not identified as other switches.

8. A computer-implemented method for generating a data model mapping a data center, the method comprising:
obtaining inventory data for a data center, the inventory data comprising information identifying switches and servers within the data center;
querying each switch in the data center using a discovery protocol to obtain switch-to-switch relationship data, the switch-to-switch relationship data from a given switch providing information identifying one or more other switches connected to the given switch;
obtaining switch-to-server relationship data for at least a portion of the switches in the data center, the switch-to-server relationship data for a given switch providing information identifying one or more servers connected to the given switch based on MAC table data on the given switch; and
persisting the inventory data, the switch-to-switch relationship data, and the switch-to-server relationship data in the data model.

9. The method of claim 8, wherein at least a portion of the inventory data is obtained by querying at least a portion of the switches and at least a portion of the server devices using the Internet Control Message Protocol (ICMP) and/or the Simple Network Management Protocol (SNMP).

10. The method of claim 8, wherein at least a portion of the inventory data is obtained from one or more existing sources of inventory data.

11. The method of claim 8, wherein the method further comprises transforming the inventory data into a canonical format.

12. The method of claim 8, wherein the discovery protocol comprises the Cisco Discovery Protocol (CDP) or the Link Layer Discovery Protocol (LLDP).

13. The method of claim 8, wherein obtaining the switch-to-server relationship data comprises interrogating each of at least a portion of the switches for MAC table data to identify a MAC address for each server connected to each switch.

14. The method of claim 13, wherein obtaining the switch-to-server relationship data further comprises:
accessing ARP data mapping IP addresses to MAC addresses for servers in the data center;
accessing DNS data mapping hostnames to IP addresses for servers in the data center; and
matching the MAC table data to the ARP data and the DNS data to identify an IP address and hostname for each server connected to each switch.

15. A computer system comprising:
one or more processors; and
one or more computer storage media storing computer-useable instructions that, when used by the one or more processors, cause the one or more processors to:
obtain inventory data for a data center, the inventory data comprising information identifying switches and servers within the data center;
query each switch in the data center using a discovery protocol to obtain switch-to-switch relationship data, the switch-to-switch relationship data from a given switch providing information identifying one or more other switches connected to the given switch;
interrogate each of at least a portion of the switches for MAC table data to identify a MAC address for each server connected to each switch from at least the portion of the switches;
access ARP data mapping IP addresses to MAC addresses for servers in the data center;
access DNS data mapping hostnames to IP addresses for servers in the data center;
obtain switch-to-server relationship data by matching the MAC table data to the ARP data and the DNS data to identify an IP address and hostname for each server connected to each switch from at least the portion of the switches; and
generate the data model of the data center based on the inventory data, switch-to-switch relationship data, and switch-to-server relationship data.

16. The system of claim 15, wherein at least a portion of the inventory data is obtained by querying at least a portion of the switches and at least a portion of the server devices using the Internet Control Message Protocol (ICMP) and/or the Simple Network Management Protocol (SNMP).

17. The system of claim 15, wherein at least a portion of the inventory data is obtained from one or more existing sources of inventory data.

18. The system of claim 15, wherein the method further comprises transforming the inventory data into a canonical format.

19. The system of claim 15, wherein the discovery protocol comprises the Cisco Discovery Protocol (CDP) or the Link Layer Discovery Protocol (LLDP).

20. The system of claim 15, wherein interrogating each of at least the portion of the switches for MAC table data comprises interrogating a first switch by:
logging into the first switch;
interrogating the first switch for interface neighbor information to identify devices connected to the first switch that are other switches; and
obtaining from a MAC table on the first switch, MAC addresses for devices connected to the first switch not identified as other switches.

* * * * *